United States Patent
Dehne

(10) Patent No.: US 7,192,668 B2
(45) Date of Patent: Mar. 20, 2007

(54) FUEL CELL STACK AND METHOD OF OPERATING A FUEL CELL SYSTEM WITH SUCH A FUEL CELL STACK

(75) Inventor: Tomas Dehne, Bornheim (DE)

(73) Assignee: General Motors Corporation, Detroit, MI (US)

(*) Notice: Subject to any disclaimer, the term of this patent is extended or adjusted under 35 U.S.C. 154(b) by 400 days.

(21) Appl. No.: 10/360,995

(22) Filed: Feb. 7, 2003

(65) Prior Publication Data

US 2003/0211374 A1 Nov. 13, 2003

(30) Foreign Application Priority Data

Feb. 8, 2002 (DE) .............................. 102 05 327

(51) Int. Cl.
  *H01M 8/04* (2006.01)
  *H01M 2/00* (2006.01)
(52) U.S. Cl. .......................................... 429/26; 429/34
(58) Field of Classification Search ................. 429/26, 429/38, 13, 34
  See application file for complete search history.

(56) References Cited

U.S. PATENT DOCUMENTS

| | | | | |
|---|---|---|---|---|
| 3,061,658 A | 10/1962 | Blackmer | | 136/86 |
| 3,462,308 A | 8/1969 | Winters | | 136/86 |
| 3,982,961 A * | 9/1976 | Grasso | | 429/34 |
| 5,441,821 A | 8/1995 | Merritt et al. | | 429/17 |
| 5,985,474 A * | 11/1999 | Chen et al. | | 429/17 |

FOREIGN PATENT DOCUMENTS

| | | |
|---|---|---|
| DE | 199 53 799 | 5/2001 |
| EP | 0940868 | 9/1999 |
| EP | 0975039 | 1/2000 |
| EP | 0984081 | 3/2000 |
| EP | 1 030 396 | 8/2000 |
| EP | 0847097 | 10/2001 |
| WO | WO98/10477 | 3/1998 |
| WO | WO98/53514 | 11/1998 |
| WO | 01/97311 | 12/2001 |

* cited by examiner

*Primary Examiner*—Patrick Joseph Ryan
*Assistant Examiner*—Thomas H. Parsons
(74) *Attorney, Agent, or Firm*—Charles H. Ellerbrock

(57) ABSTRACT

A fuel cell stack comprising a plurality of fuel cells which are connected together. Each cell has an anode, a cathode, and a membrane therebetween and which are each arranged between two bipolar plates. The anode sides of the individual fuel cells have flow fields for a gaseous fuel supplied to the fuel cells extending between an anode space arranged at the top in the fuel cell stack and an anode space arranged at the bottom of the fuel cell stack. A collecting container is provided in the anode space arranged at the bottom of the fuel cell stack for water which is produced during the electrochemical reaction and is present in the form of a liquid and the water which is collected there has an evaporation surface and serves for the humidification of the fuel fed to the fuel cell stack.

16 Claims, 10 Drawing Sheets

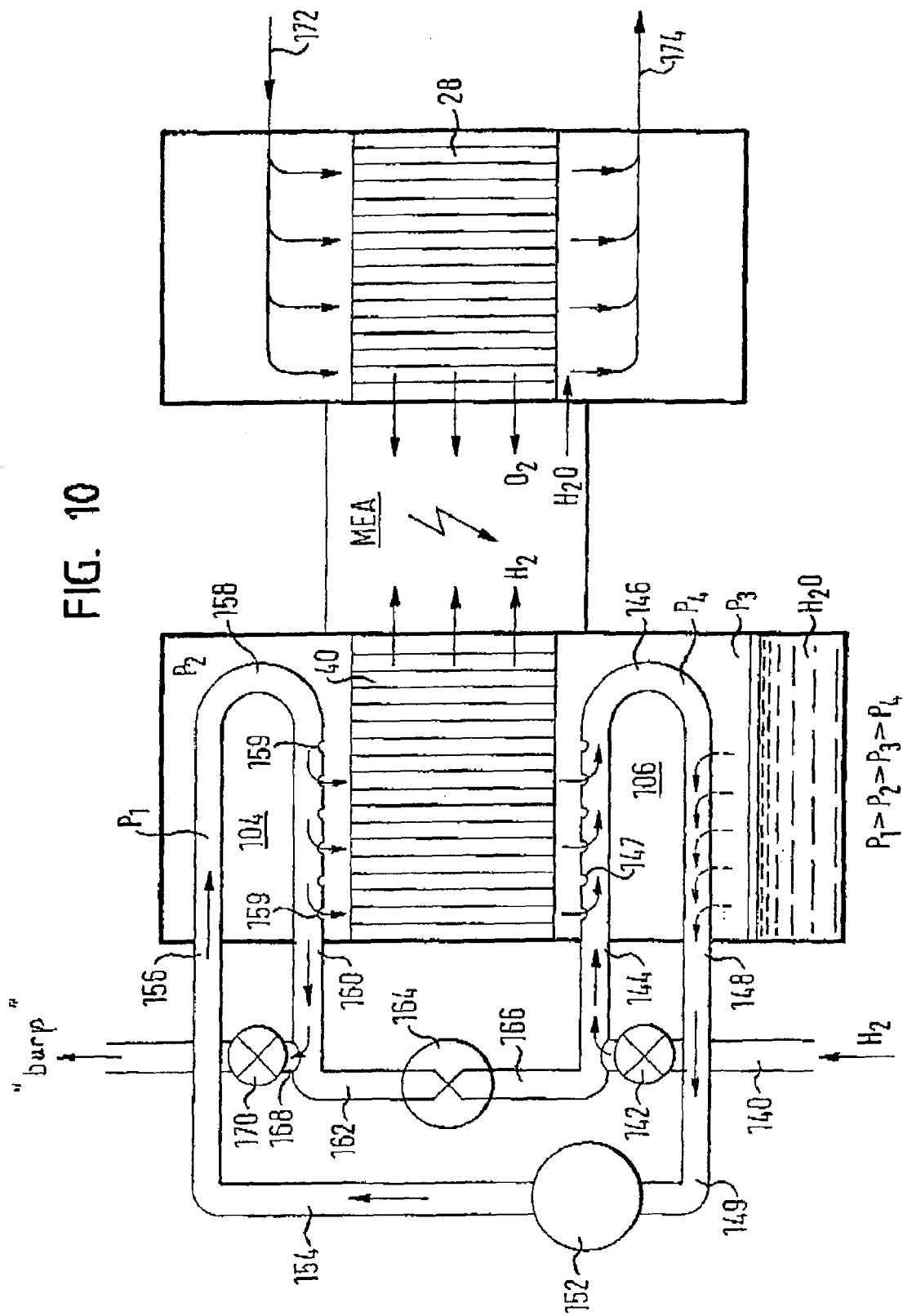

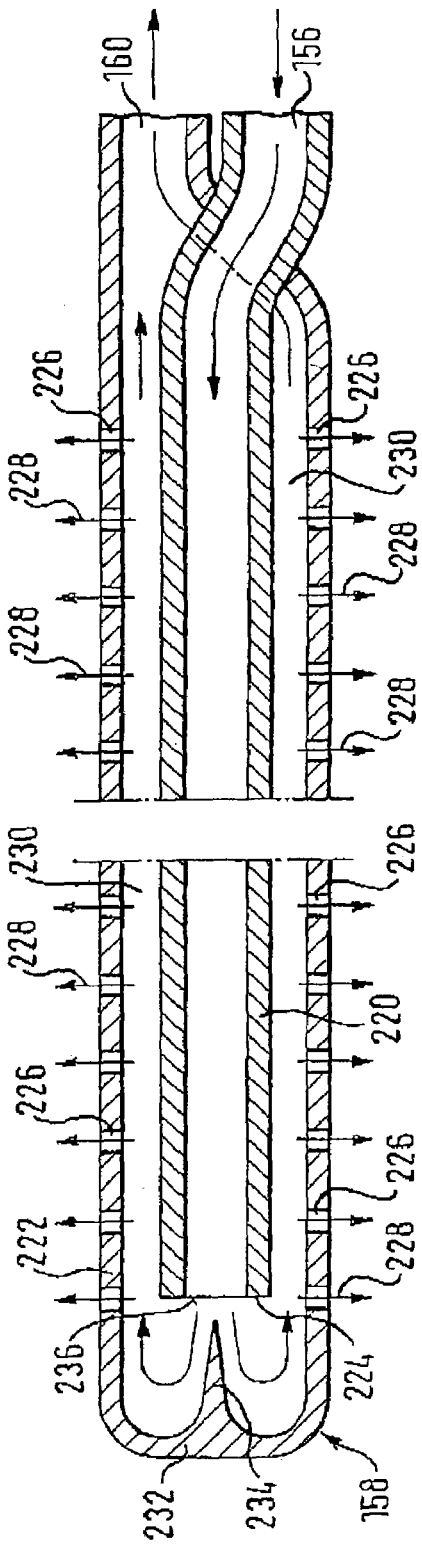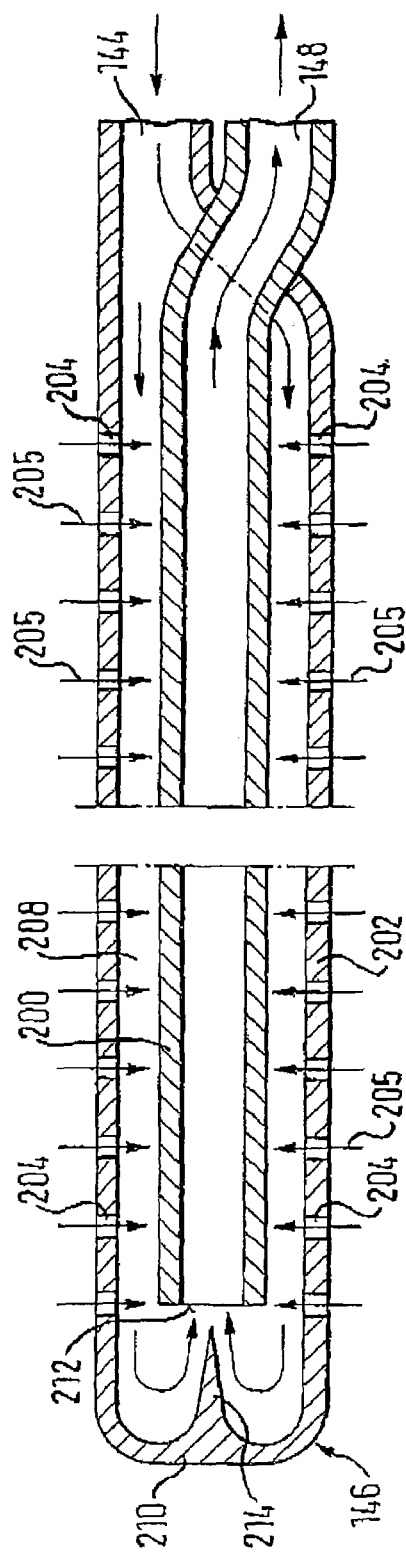

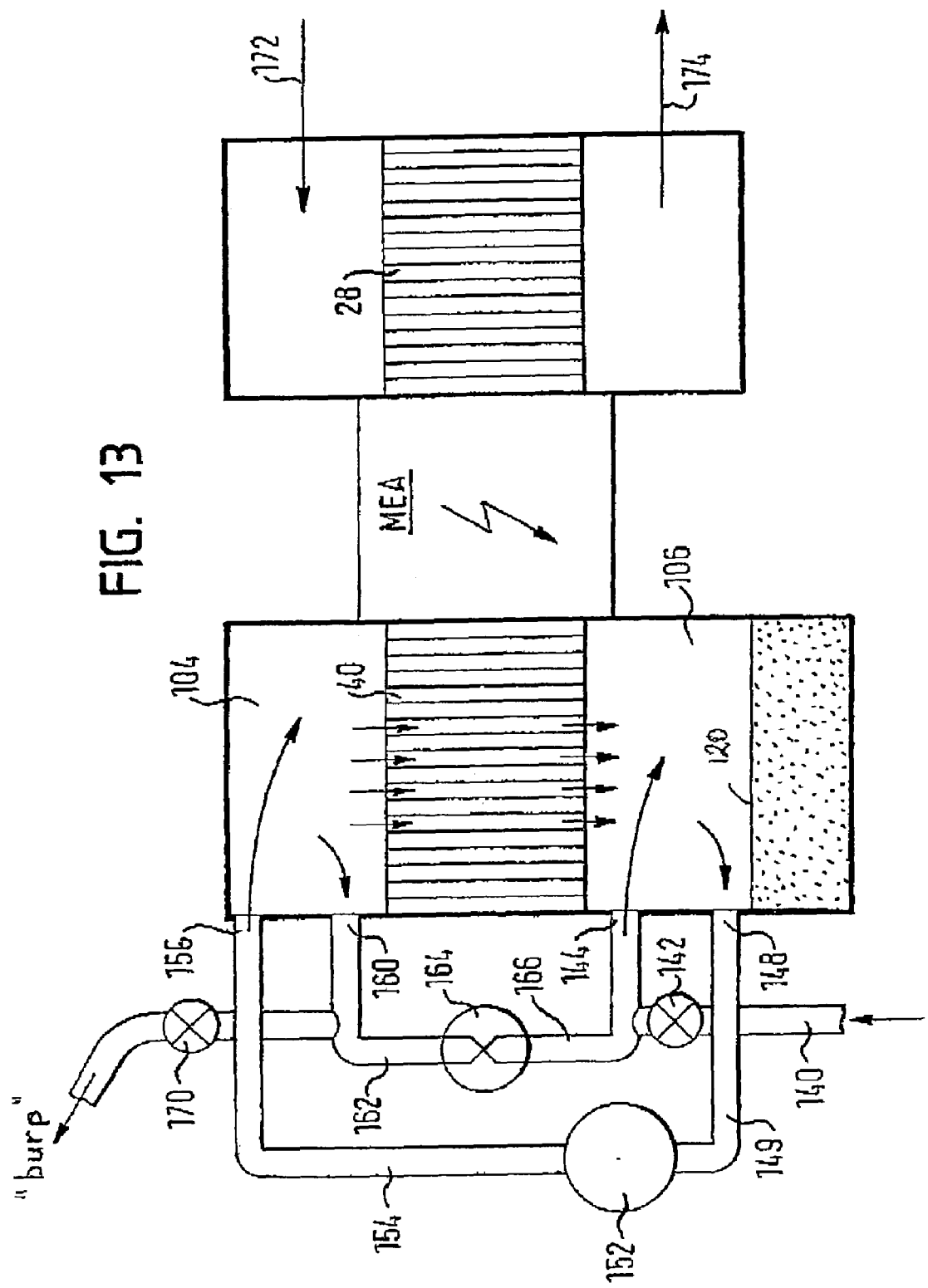

FUEL CELL STACK AND METHOD OF OPERATING A FUEL CELL SYSTEM WITH SUCH A FUEL CELL STACK

TECHNICAL FIELD

The present invention relates to a fuel cell stack comprising a plurality of fuel cells which are connected together and which each have an anode and a cathode as well as membrane arranged there between and which are each arranged between two bipolar plates, with the anode sides of the individual fuel cells having flow fields for a gaseous fuel supplied to the fuel cells and the cathode sides of the individual fuel cells having flow fields for a gaseous oxidizing agent fed to the fuel cells and wherein the fuel and the oxidizing agent react on catalyst material within the fuel cells for the production of electrical energy with the simultaneous production of water, and with the anode side flow fields extending between an anode space arranged at the top in the fuel cell stack and an anode space arranged at the bottom of the fuel cell stack. Furthermore, the invention also relates to a method for the operation of such a fuel cell stack.

BACKGROUND OF THE INVENTION

A fuel cell stack of the initially named kind is for example known from U.S. Pat. No. 5,441,821. There fuel (hydrogen) is supplied to the anode inlet of a fuel cell stack and hydrogen which is not consumed when flowing through the anode side flow fields of the fuel cell stack is passed through a collecting container for liquid water and is supplied to the anode inlet again together with fresh water. The arrangement is contrived such that the fresh hydrogen is introduced into an injector pump and produces there a suction action which sucks in the returned hydrogen and moves it along together with the fresh hydrogen emerging from the injector pump and feeds it anew to the anode inlet of the fuel cell stack. There it is stated that the proportion of hydrogen which is returned (which contains water vapor) can be mixed with the fresh hydrogen in order to humidify the inflowing fresh hydrogen and to hereby avoid the necessity of a separate humidifying device. It is generally known that so-called PEM fuel cells have to be operated with hydrogen with a certain degree of humidity in order to achieve a high degree of efficiency and to keep the membranes present in the fuel cells moist and to hereby avoid damage with could occur with membranes that are not sufficiently moist.

U.S. Pat. No. 5,441,821 also refers to U.S. Pat. No. 3,462,308 issued Aug. 19, 1969 to Winters which shows a similar system but with an additional discharge valve in the hydrogen return loop which is controlled in order to ensure the correct conditions at the injector pump.

It is moreover known that with a fuel cell stack with return of the hydrogen the proportion of nitrogen and water in the anode circuit rises gradually and leads to a deterioration of the efficiency. In order to counteract this it is known either to continuously discharge a part of the gases that are flowing or to discontinuously open a discharge valve in order to flush the anode side flow circuit from time to time with fresh hydrogen and to keep the efficiency at a high level in this way. Through this manner of operating, which is termed "burp operation" it is possible to significantly stabilize the performance of the fuel cell stack.

Problematic with a manner of operation of this kind is, above all with a compact construction of a fuel cell stack, that a relatively high pressure drop occurs across the fuel cell stack at the anode side. This leads to a situation in which the power requirement for the circulation pump that is used increases. This increase of the power requirement of the circulation pump has on the one hand a negative influence on the overall efficiency of the system and leads on the other hand to a temperature increase of the recirculant after the pump. In order to counteract this increase it was previously necessary to install an additional cooler between the recirculation pump and the fuel cell stack.

SUMMARY OF THE INVENTION

The principal object of the present invention is to provide a fuel cell stack of the initially named kind in which the required humidification of the fuel supplied to the anode side is ensured, the provision of a cooler or heat exchanger between the recirculation pump and the fuel cell stack is dispensed with, a homogeneous gas and humidity distribution is provided at the anode side and the loss of fuel through the need to discharge fuel circulating in the anode flow circuit is minimized. Furthermore, it should preferably be possible to avoid the provision of an external water tank system.

In order to satisfy the above object there is provided a fuel cell stack comprising a plurality of fuel cells, each said fuel cell having an anode defining an anode side, a cathode defining a cathode side and a membrane arranged between said anode and said cathode, each said fuel cell being arranged between first and second bipolar plates, there being flow fields at said anode sides for a gaseous fuel supplied to said fuel cells and flow fields at said cathode sides for a gaseous oxidizing agent fed to said fuel cells and catalyst material within said fuel cells at which said fuel and said oxidizing agent react for the production of electrical energy with the simultaneous production of water, said fuel cells being connected together and having an upper anode space at a top of said fuel cell stack and a lower anode space at a bottom of said fuel cell stack, said anode side flow fields extending between said upper anode space and said lower anode space, said fuel cell stack further comprising a collecting container provided at said lower anode space for water produced during the reaction of said fuel and said oxidizing agent and present in the form of a liquid, said water in said collecting container having an evaporation surface serving for the humidification of fuel fed to said fuel cell stack.

Through this design of the fuel cell stack, and instead of using a customary external water separating device with a collecting container for water, the collecting container is arranged in the lower anode space, or the lower anode space is formed as a collecting container, so that water collects there in liquid form under the action of gravity. As a result of the size of the area of the porous medium installed in the lower anode space the water collected there has a large evaporation surface, whereby the supplied fuel can, on the one hand, be adequately humidified and, on the other hand, is however also brought to the prevailing temperature level of the fuel cell stack. Through this preconditioning of the anode gases in the lower anode space the resulting configuration means that the recirculation pump only has to satisfy the function of transporting the medium, i.e. the anode gases. The recirculation pump can thus be operated at the lower stability limit. In this way the thermal power introduced into the recirculation flow is significantly reduced and it is possible to dispense with an additional cooler or heat exchanger between the recirculation pump and the fuel cell stack.

Through the homogenous gas and humidity distribution at the anode side a homogenous energy production is furthermore achieved over the entire surface area of the fuel cells and this leads on the one hand to a reduction of the stochiometry at the anode side of the fuel cell stack, i.e. the ratio between the supplied quantity of hydrogen and the quantity of hydrogen converted at the anode side, whereby the pressure drop across the anode side of the fuel cell stack is reduced. Since the configuration makes it possible to operate the recirculation pump at the lower stability limit, the pump can be dimensioned significantly smaller and leads to an improved system efficiency.

One possible configuration lies in the provision of a line system having at least one first line which is located in the lower anode space and has an inlet and an outlet which leaves via a pump and a second line to the upper anode space and in that the line system is designed to feed humidified not yet consumed fuel coming from the anode side flow fields and from the lower anode space into the upper anode space in the sense of a return feed of the fuel.

For this purpose the line provided in the lower anode space preferably has at least one opening for the reception of humidified fuel from the lower anode space. The inlet of the line provided in the lower anode space forms a fuel inlet for fresh fuel coming from the outside, with a fuel supply device, for example in the form of a valve, being inserted in front of this inlet.

Furthermore the line system preferably has at least one third line provided in the upper anode space and having an inlet and an outlet, at least one opening is provided in the third line in order to allow fuel coming out of the second line to flow into the upper anode space and the outlet of the third line communicates via a fourth line with the inlet of the first line in the lower anode space. A restrictor valve is preferably provided in this fourth line and the discharge device for gases flowing at the anode side is preferably connected to the fourth line upstream of the restrictor valve.

The first and third lines of the lower anode space and in the upper anode space preferably each have the form of at least one loop and the at least one opening in the two lines or loops is preferably provided in that a tube is used having a perforated wall with a plurality of smaller openings. In this way an extended distributing and collecting function is achieved in the respective anode spaces, whereby a more uniform gas and humidity distribution can be achieved in the fuel cell stack.

In a fuel cell stack having the above described design the specific layout of the line system for the guidance of the gaseous fuel is as follows:
- the fresh fuel is supplied via the fuel supply device to the inlet of the first line in the lower anode space,
- non-consumed fuel which leaves the anode side flow fields flows through at least one opening of the first line into the first line and, together with the fresh fuel, flows further via the pump and the second line leading to the upper anode space into the inlet of the third line located in the upper anode space,
- a first part of the fuel entering into the third line flows out of the at least one opening of this third line into the upper anode space and into the anode side flow fields, with fuel not consumed in the fuel cells passing through the anode side flow fields into the lower anode space and
- a second part of the fuel entering into the third line flows through the restrictor valve and a further line to the inlet of the first line provided in the lower anode space at the downstream side of the fuel supply device, with a branch in the line system leading to the discharge device for the continuous or discontinuous discharge of a part of the gases circulating at the anode side.

It is however not essential to form the lines in the upper and lower anode space by loops, but rather a coaxial arrangement of lines can likewise be considered. For example, the first line provided in the lower anode space can be formed by an inner tube and an outer tube, with the outer tube having the inlet for fresh fuel at its one end and a perforated wall through which the non-consumed fuel coming from the flow fields can be sucked in under the action of the recirculation pump and can be fed with the fresh fuel through a flow passage formed between the two tubes to the end of the outer tube remote from the inlet and fed there into the inner tube, which leads the fuel to the outlet of the inner tube arranged close to the inlet.

In a similar sense the third line provided in the upper anode space can be formed by an inner tube and an outer tube, with the inner tube having the inlet for fuel as its one end and opening, at its end remote from the inlet, within the outer tube, which has a perforated wall through which a part of the entering fuel can emerge and can enter into the anode side flow fields, with a further part of the ingoing fuel being capable of being led from a flow passage formed between the two tubes to the outlet at the end of the outer tube adjacent to the inlet of the inner tube.

Instead of using constructions in which lines are provided in the upper and lower anode spaces, a fuel cell stack can be designed in accordance with the invention such that the upper anode space has an inlet for gaseous fuel which is supplied into the upper anode space and also an outlet for a part of this gaseous fuel, with a further part of a gaseous fuel flowing out of the upper anode space into the anode side flow fields; such that a line is provided between the outlet of the upper anode space and an inlet of the lower anode space for the further part of the gaseous fuel; such that a restrictor position or restrictor valve is built into this line; such that a supply line for fresh fuel opens into the last named line downstream of the restrictor position or of the restrictor valve; such that a fuel supply device is provided in the supply line; such that an outlet of the lower anode space is connected to the inlet of the upper anode space via a further line; such that a pump is provided in the further line which connects the outlet of the lower anode space with the inlet of the upper end of the upper anode space; such that a branch line branches off from the line connecting the outlet of the upper anode space with the inlet of the lower anode space upstream of the restrictor position or the restrictor valve and such that a discharge device is provided in the branch line.

A method in accordance with the invention for operating a fuel cell stack of the initially named kind preferably comprises the steps of:
- collecting water produced during the electrochemical reaction and present in the form of a liquid in or adjacent to said lower anode space,
- exploiting evaporation from said liquid water for the humidification of supplied fuel in or adjacent to said lower anode space,
- supplying the fuel humidified in or adjacent to said lower anode space to said upper anode space and
- feeding at least a part of said humidified fuel from said upper anode space into said anode side flow fields.

The manner of operation of the fuel cell stack of the invention can be summarized as follows.

The lower anode space is humidified because, on the one hand, the gas emerging from the anode side flow fields is saturated humidity-wise and, on the other hand, the water which appears in liquid form collects as a base liquid in the lower anode space and humidifies the latter by evaporation at the prevailing anode space temperature.

This base liquid can be taken up in a sponge or other porous material in order to enlarge the evaporation surface. This sponge should lie in a trough which is stable temperature-wise and non-conductive. Should the excess water become too large it must run through an overflow in the trough into an overflow chamber and can be discharged there on reaching a maximum filling level by the opening of a suitable discharge valve.

The distance between the highest level of the water forming the base liquid and the bipolar plates integrated into the fuel cell stack should be sufficiently large that a decoupling is provided between the potential carrying bipolar plates and the base liquid, so that a short circuit resulting from the possible enrichment of the base liquid with contaminants, which could lead to a rise in conductivity, is prevented. The trough incorporating the water with the overflow chamber should preferably be constructed as an insert for the lower anode space.

The material used for any lines present in the upper and the lower anode spaces should be temperature-resistant and non-conducting.

In operation the recirculation pump forces a gas exchange between the lower moist anode space and the upper dry anode space and thus increases the relative humidity in the upper anode space.

In normal operation the discharge valve is closed and the restrictor valve and also the power of the recirculation pump are set such that the pressure in the upper recirculation circuit lies above that of the upper anode space. Moreover, the pressure in the upper anode space must be larger than the pressure in the lower anode space in order to impose a flow direction from the upper anode space to the lower anode space.

These relationships enable the following functions.

The temperature of the fresh fuel is approximated, in just the same way as the recirculated gas from the upper anode space after entry into the lower anode space, to the temperature which prevails there and humidified fuel flows as a result of the pressure difference between the lower recirculation circuit and the lower anode space out of the lower anode space into the lower recirculation circuit, for example through the holes which are arranged in the line provided there. The gas which has been conditioned hereby is pumped by the recirculation pump into the upper anode space.

A temperature increase brought about as a result of the compression by the recirculation pump can be compensated by the end plate which relates to the temperature of a fuel cell stack and by the imperforated part of the loop forming the lines in the upper anode space. As a result of the excess pressure in this line located in the upper anode space the prepared gas enters relatively homogenously into the upper anode space through the holes provided in the line. This difference between the upper anode space and the lower anode space brings about the required small forced flow through the anode side flow fields to the active regions of the membrane electrode units of the individual fuel cells.

In operation the concentration of nitrogen in the anode flow circuit increases by diffusion from the cathode side and water collects in the anode side flow fields. If, as a result, the smallest cell voltage drops too much, or if the scatter of the cell voltages increases too much, then the fuel cell stack can be regenerated by flushing the fuel cells with fresh hydrogen and discharging a small quantity of gas (burp operation). For this purpose the restrictor valve is closed and the recirculation pump conveys the largest possible gas flow through the anode side flow fields. These are flushed with $H_2$ and any water which has eventually collected is driven out. If one simultaneously discharges a certain quantity of gas out of the anode circuit then the $N_2$ concentration can be lowered, whereby the cell voltages are stabilized again. If the scatter of the cell voltages again lies in a permissible range then the restrictor valve is opened again, the discharge valve is closed and the system is operated further in the normal mode. The system of the invention leads to the following advantages:

1. Higher system efficiency as a result of a smaller recirculation pump.
2. A reduction of the loss of $H_2$ by reduction of the discharge quantity of $H_2$ in burp operation, with this reduction of the $H_2$ loss leading to a greater range of the vehicle and to an increase of the system efficiency (as a result of compulsory discharge losses).
3. Homogeneous gas and humidity distribution at the anode side.
4. A more favorable recirculation pump can be used as a result of the reduced requirements for this pump.
5. A heat exchanger between the recirculation pump of the fuel cell stack and also an external water separating device can be omitted.
6. An improvement of the working life of the cells at the "dry end" of the fuel cell stack, i.e. the region of the upper anode space due to the more homogeneous gas and humidity distribution.

Further preferred embodiments of the invention are set forth in the claims. The invention will be explained in more detail in the following by way of example only and with reference to embodiments and to the accompanying drawings.

BRIEF DESCRIPTION OF THE DRAWINGS

FIG. 10 shows a schematic illustration of a fuel cell stack corresponding to FIGS. 6 to 9 from which the line guidance of the anode side is clearer;

FIG. 11 shows a schematic illustration of a coaxial line which can be used instead of the loop shown in FIG. 10 in the upper anode space;

FIG. 12 shows a schematic illustration of a coaxial line which can be used instead of the loop shown in FIG. 10 in the lower anode space;

FIG. 13 shows a schematic illustration similar to that of FIG. 10 but of an alternative embodiment of the invention;

DESCRIPTION OF THE PREFERRED EMBODIMENT

Figure 1:
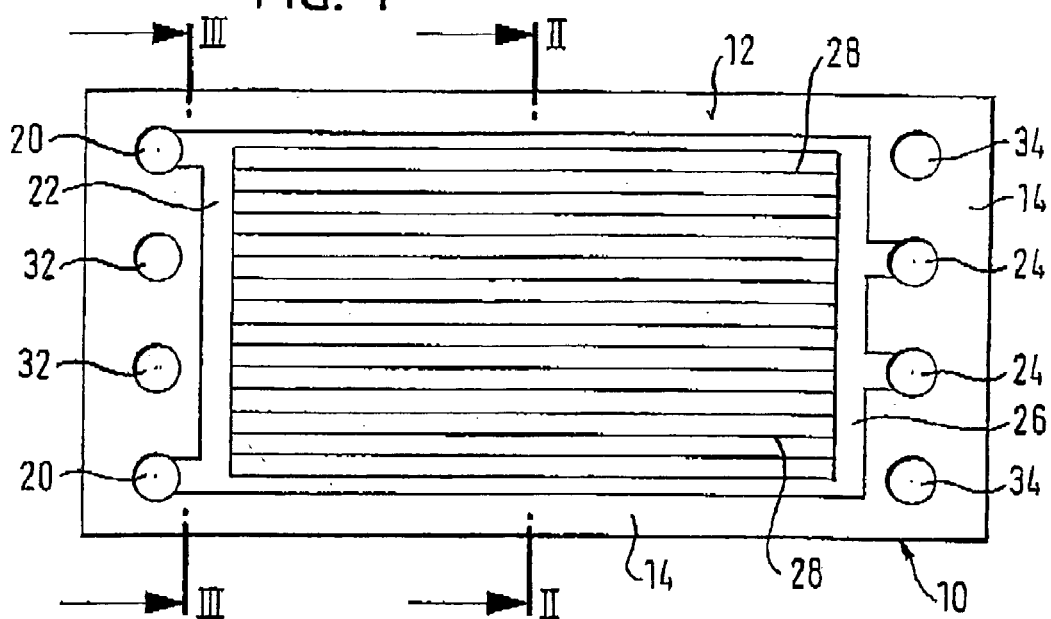
FIG. 1 shows a schematic plan view of an embodiment of a bipolar plate of a fuel cell.
Figure 2:
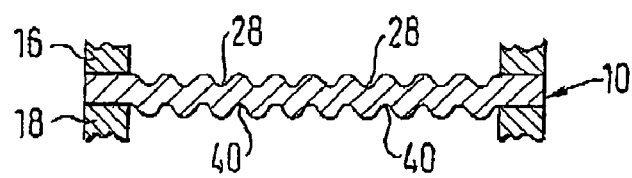
FIG. 2 shows a cross-section through the embodiment showing in FIG. 1 along the line II—II.
Figure 3:
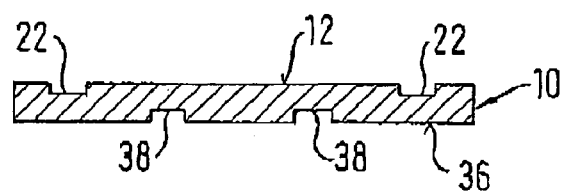
FIG. 3 shows a cross-section through the embodiment shown in FIG. 1 along the line III—III.
Figure 4:
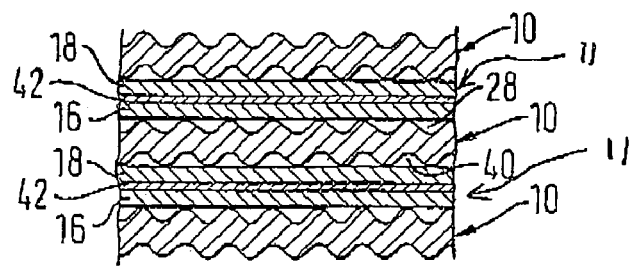
FIG. 4 shows a schematic cross-section of a portion of two adjacent fuel cells or three bipolar plates of the embodiment shown in FIG. 1.

The FIGS. 1 to 3 first of all show a bipolar plate 10 for a fuel cell. The bipolar plate is suitable for use in a fuel cell stack consisting of a plurality of stack PEM fuel cells (as indicated in FIG. 4 and schematically shown in FIGS. 5 and 10). Such bipolar plates are well known per se in various embodiments, they are for example described in the following documents: EP-A-97202343.6, EP-A-0975039, WO 98/53514, EP-A-0940868, WO 98/10427 und EP-A-0984081.

The present FIGS. 1 to 4 are simply schematic drawings in order to explain the shaping of such a bipolar plate and also the construction of a fuel cell stack.

The top side of a bipolar plate 10 of FIG. 1 is provided with a peripherally extending rim 14 which lies in one plane, as is the bottom side of the bipolar plate 10. This makes it possible to integrate the plate into a stack of plates and to ensure a sealed connection to further plates 10 which are only schematically shown in FIGS. 2 and 3. At one side of the plate 10 there are two supply openings 20 for, for example, air, which communicate with a recessed channel region 22. At the other side of the bipolar plate there are two discharge openings 24 for spent air, i.e. air having a reduced oxygen content, which communicate with a recessed channel region 26. Between the recessed channel region 22 and the recessed channel region 26 flow passages 28 extend in the longitudinal direction of the bipolar plate which form flow fields and make it possible for the air supplied via the supply openings 20 to flow from the left side of the plate to the right side to the discharge openings 24. In this way this air reaches catalytically coated surfaces of the cathode 16 belonging to the membrane electrode unit (MEA) arranged above the passages 28 and reacts there with protons, which are supplied from the anode side of the fuel cell as will be described later, to form water, with an electrical current being produced which flows through the bipolar plate 10.

The further openings 32 and 34 of the plate represents supply and discharge openings for hydrogen; these are separated at the upper and lower sides 12 and 36 respectively of the bipolar plate in FIG. 3 by regions of plate which lie in the plane of the frame 14 from the air supply and discharge openings 20 or 24 respectively and from the correspondingly recessed regions 22 and 26 and are sealed relative to the latter and to the outer environment.

At the lower side 36 of the plate 10, in accordance with FIG. 3 recessed channel regions are provided in an inverse arrangement relative to FIG. 1, i.e. the two supply openings 32 communicate with a recessed channel region 38 in accordance with the channel region 22 at the upper side of the plate 10, whereas the two discharge openings 34 communicate with a (non shown) recessed channel region which is formed corresponding to the channel region 26. The channel regions at the lower side 36 of the plate 10 communicate with the longitudinal passages 40 formed in the lower side of the plate so that hydrogen can flow from the supply openings 32 to the discharge openings 34. The channel regions at the lower side 30 of the bipolar plate 10 likewise form flow fields.

As shown in FIG. 4 the lower side of the bipolar plate 10 of FIG. 3 belongs to the adjacent fuel cell and delivers protons via the anode 18 to the membrane 42 of this cell, with the protons passing through the membrane 42 and being reacted in the adjacent chamber at the cathode 16 with atmospheric oxygen, whereby, on the one hand electrical power arises and on the other hand water is produced.

The air flow in the adjacent cell is made available by the lower bipolar plate 10 provided there in just the same way as by the bipolar plate 10 of FIG. 1. As is known a fuel cell consisting of an anode (here the plate 18), a cathode (here the plate 16) and between them an electrolyte in the form of a membrane (here the membrane 42) exists between two adjacent bipolar plates 10, with the plates 16, 18 and the membrane lying there between forming the above-mentioned so-called MEA. The flow fields formed by the flow passages 28 are thus cathode-side flow fields and the flow fields formed by the flow passages 40 are thus anode-side flow fields.

The bipolar plate 10 is formed of stainless steel, can however be formed, for example, of titanium, steel, tin plate, aluminum, magnesium and/or an alloy of the named metals, which can optionally be provided with a corrosion protection layer.

The plates of the fuel cell stack of FIG. 4 are so put together that the air supply passages 20 all lead to an upper cathode space 100 (FIGS. 6 and 7) whereas the outlet passages 24 for non consumed air all lead to a lower cathode space 102 in the fuel cell stack.

Figure 6:
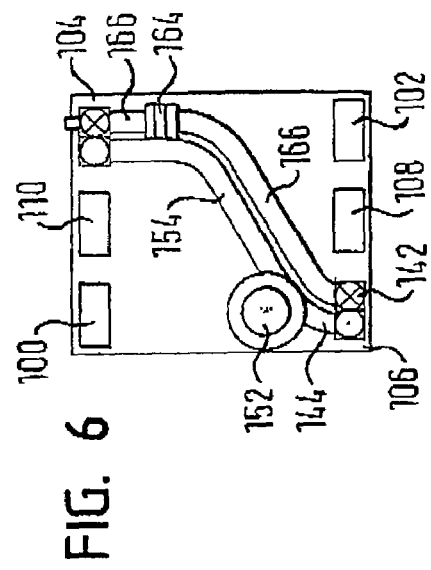
FIG. 6 shows a front view of the fuel cell stack of FIG. 5.
Figure 8:
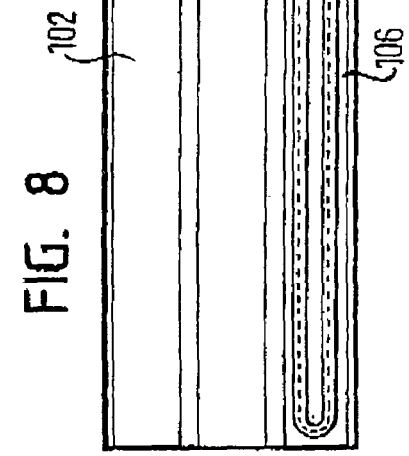
FIG. 8 shows a view from below of the fuel cell stack of FIG. 5 with the drawings of FIGS. 5, 7 and 8 being partly broken away in order to schematically illustrate the internal details of the fuel cell stack.
Figure 5:
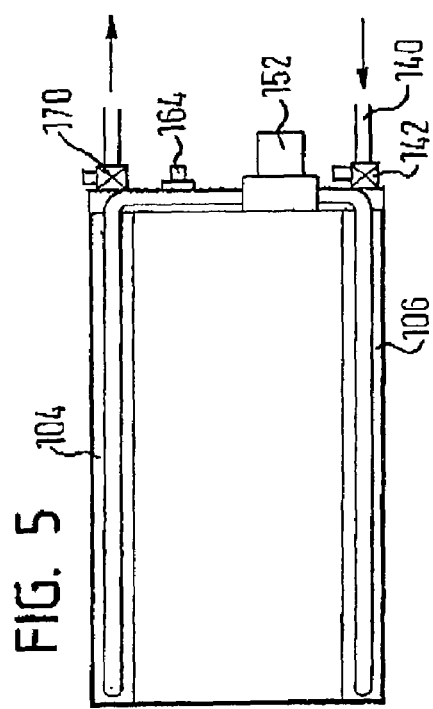
FIG. 5 shows a side view of a fuel cell stack in accordance with the invention.
Figure 7:
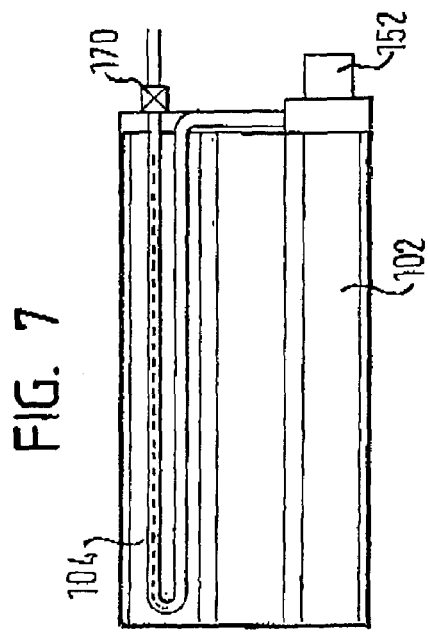
FIG. 7 shows a top plan view of the fuel cell stack of FIG. 5.

In similar manner the inlet passages 32 for fuel lead to an upper anode space 104 (FIGS. 5, 6 to 7), whereas the discharge passages 36 for non consumed fuel lead to a lower anode space 106 (FIGS. 5, 6 and 8). This does not necessarily signify a special arrangement of the individual fuel cells in the fuel cell stack but rather only that the corresponding supply and discharge passages lead to the respective cathode spaces 100, 102 and the anode spaces 104, 106 through internal passages of the fuel cell stack.

Normally measures are taken to cool the bipolar plates, either in the form of a liquid cooling system or in the form of a gas cooling system and for this purpose the bipolar plates have internal passages which lead between a coolant inlet 108 and a cooling outlet 110 in FIG. 6. The corresponding cooling circuit (not shown here but described later in connection with FIG. 14) is completely separate from the anode circuit and the cathode circuit flow-wise and will not be described further here because it is not initially of significance for an understanding of the present invention. The internal cooling passages of the bipolar plates can be formed by separating the bipolar plates in the center and providing at least one of the oppositely disposed halves with a structuring which forms the cooling passages.

Since the lower anode space 106 lies beneath the upper anode space 104 it is ensured that water in liquid form which is located in the fuel cell stack can move, as a result of gravity and as a result of the flow through the anode side flow fields, to the lower anode space 106.

Figure 9:
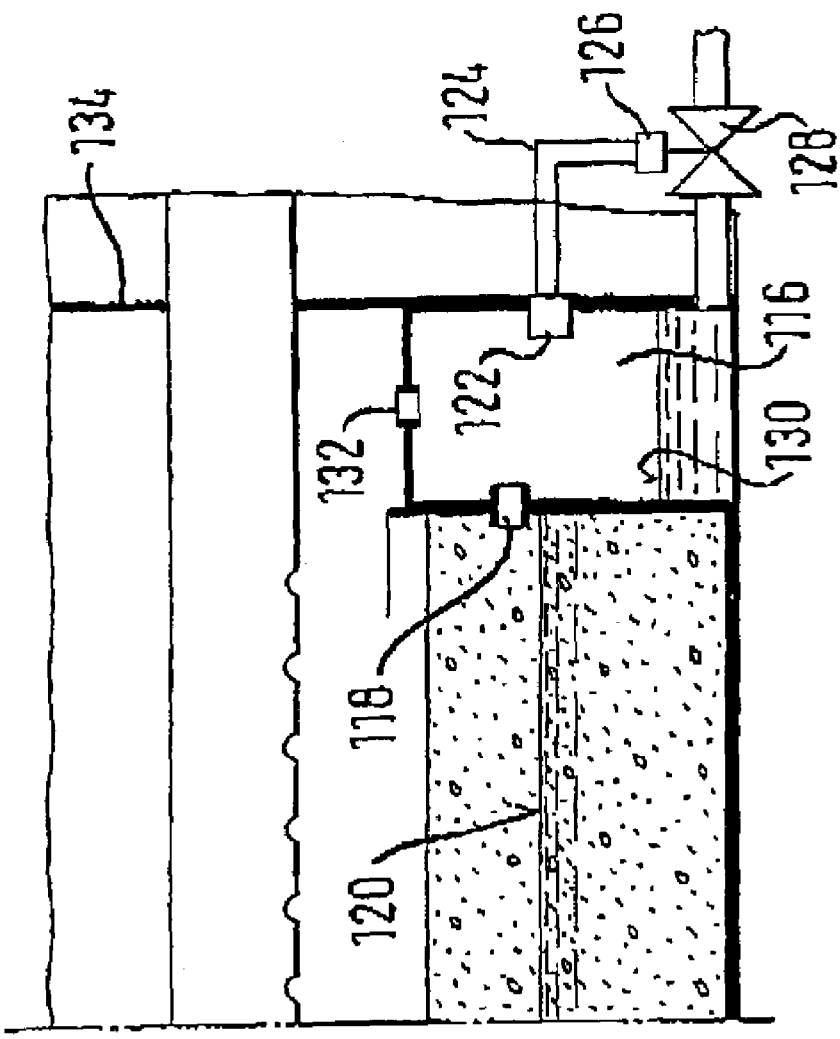
FIG. 9 shows a detailed side view similar to the side view of FIG. 5 but with an illustration of a trough for the reception of the water collecting in the lower anode space.

As shown in FIG. 9 a trough 112 provided as an insert is provided in the lower region of the lower anode space 106 and is filled with a foam 114. This foam is an open pored material, for example of plastic or of ceramic material which has a large evaporation surface for water contained there.

Adjacent to the trough 112 which functions as the collecting container there is an overflow chamber 116 for liquid water, with an opening 118 in the wall of the trough or of the overflow chamber 116 representing an overflow, so that the water level 120 in the trough is stabilized at least substantially at the level of the overflow 118. In the overflow chamber 116 there is a filling level sensor 122 which is coupled via control lines 124 and an appropriate control 126 to a discharge valve 128 50 that, when the water level 120 in the overflow chamber 116 reaches the level of the filling level sensor 122 the valve 128 is opened, in order to discharge the water out of the overflow chamber 116.

The reference numeral 132 points to a pressure compensation opening, so that the pressure in the overflow chamber 116 corresponds to the pressure in the lower anode space 106.

Both the trough 112 and also the overflow chamber 116 are manufactured from a temperature-stable material and are designed to be non-conductive. They are preferably joined and secured to an end plate 134 of the fuel cell stack and can be removed from the fuel cell stack by releasing the end plate (via non-illustrated screw connections with intermediate seals) together with the end plate, i.e. the trough 112 and the overflow chamber once again form an insert.

As is evident from FIGS. 5 to 9 the lower anode space 106 and the upper anode space 104 are connected to one another by a line system, with the design of this line system being somewhat simpler to understand if one simultaneously considers FIG. 10. The design of the line system will now be explained in more detail with reference to FIGS. 5 to 10.

Fresh fuel, for example hydrogen from a hydrogen supply tank (not shown) or a hydrogen-rich synthetic gas from a reformation unit (likewise not shown) is supplied via a schematically illustrated line 140 and a fuel supply device 142, which can be realized as an inlet valve in the form of a digital valve, or a proportional valve, or a setting valve or an injector, to the inlet 144 (FIG. 10) of a first line 146 in the lower anode space. This line 146 is formed as a U-shaped loop and indeed by a tube with a perforated wall, with the perforations 147 forming openings which make it possible for the non-consumed but well humidified fuel flowing out of the anode side flow fields 28 to be sucked into the first line 146. This sucking in takes place as a result of the sucking effect of a recirculation pump 152 which conveys the sucked in gases via a second line 154 into the inlet 156 of the third tube 158, which likewise forms a loop, into the upper anode space 104. The third line 158 has a perforated wall, with the perforations such as 159 each forming an opening by which a part of the fuel supplied by the pump 152 flows into the upper anode space and can flow through the flow fields 40 at the anode side. A further part of the fuel supplied by the pump 152 flows via the outlet 160 out of the third line 158 again and into a fourth line 162. The outlet 160 of the line 158 leads via this fourth line 162 to a restrictor valve 164 which in turn is connected via a yet further line 166 to the inlet 144 of the line 146 in the lower anode space, i.e. the line 166 is connected downstream of the inlet valve 142 located in the line 140 to the inlet 144 of the first line.

An additional line 168 branches off from the fourth line 162 and contains a discharge valve 170, which, in this example, is controlled discontinuously in order to realize the burp operation for the flushing of the fuel flow circuit formed by the lines 146, 154, 158, 162 and 166 and the anode flow fields 40.

In operation fresh fuel is supplied via the inlet valve 142 to the inlet 144 of the line 146 in the lower anode space. Non-consumed fuel which leaves the anode side flow fields 40 flows into the lower anode space 106 and is sucked as a result of the suction action of the pump 152 through the openings 147 in the line 146 into this line and is forced, mixed with the fresh fuel, via the line 154 into the line 158 in the upper anode space 104. There a part of the mixture of fresh hydrogen and non-consumed returned hydrogen leaves the line 158 through the opening 159 provided there and flows into the anode side flow field 40. Hydrogen or fuel which is not consumed there then enters again into the lower anode space 106 and is sucked in by the pump 152 as previously described.

The water collecting at the anode side of the fuel cell stack flows out of the flow fields 40 with the non-consumed fuel and collects in the trough 112 described in connection with FIG. 9 in the lower region of the lower anode space 106. Through the evaporation surface of this water the gases which are located in the anode space 106 and come from the flow fields 40 are always adequately humidified, so that the pump 152 can always convey homogenously humidified gases into the upper anode space 104.

A further part of the gases flowing in the line 158 is supplied via the fourth line 162 and the restrictor valve 164 to the inlet 144. Through the restrictor valve 164 the required pressure conditions can be ensured. Accordingly the pressure $P_1$ at the inlet 156 of the line 158 should be higher than the pressure $P_2$ in the upper anode space 104 so that a part of the supplied fuel in the line 158 can flow out of the openings 159 in the upper anode space 104. The restrictor valve 164 also ensures that the pressure $P_3$ in the lower anode space 106 is lowered than $P_2$ so that the hydrogen or fuel located in the anode space 104 is forced to flow through the flow fields 40 past the membranes of the fuel cells. The pressure $P_4$ at the outlet end 148 of the line 146 in the lower anode space is in turn smaller than $P_3$ in order to ensure that non-consumed fuel flows out of the lower anode space 106 into the line 146 and is mixed there with the freshly supplied hydrogen and also with the returned hydrogen supplied via the restrictor valve 164 and the line 166. As a result of this mixing the gases which are sucked in by the pump are always adequately humidified and have been brought to the temperature of the fuel cell stack so that a homogeneous gas, humidity and temperature distribution is achieved in the upper anode space and in the anode side flow fields 40.

The guidance of the lines 149, 154, 162, 166 and also the attachment of the fuel supply device 142, of the pump 152 and of the restrictor valve 164 to the end plate of the fuel cell stack also helps in producing a uniform temperature level of the fuel.

FIG. 10 furthermore shows in a schematic form the cathode side flow fields 28 which receive compressed air via the cathode inlet 100 (FIG. 6) (arrow 172) and conduct this to the cathode outlet 102 (FIG. 6) where it emerges out of the fuel cell stack in accordance with the arrow 174. The MEAs 16, 42 and 18 located between the anode side and cathode side flow fields 40 and 28 are only schematically illustrated here. It will be understood that the illustration of FIG. 10 is a purely graphical illustration in order to make the layout easier to understand.

The previous description of FIG. 10 has been formulated as if all lines discussed there were separate lines which have respective clearly identifiable inlets and outlets. This is however not necessarily the case, the lines could be understood as line section of a continuous line in which only separate devices such as the fuel supply device 142, the pump 152, the restrictor valve 164 and the discharge valve 170 have been inserted. Moreover, the described inlets and outlets can be understood such that they merely represent the transition region between the different line sections. For example, that the inlet 144 represents the transition of the line 166 to the first line section 146, that the outlet 148 represents the transition from the first line 146 to the line 149 leading to the pump 152, that the inlet 156 represents the transition from the line 154 into the third line 158 and that the outlet 160 represents the transition from the third line 158 into the fourth line 162.

Furthermore, is not essential that the first line 146 and the third line 158 are formed by respective tube loops. Instead of this a coaxial arrangement could be considered, with FIG. 12 showing an example of the coaxial line which can be used instead of a first line 146.

In accordance with FIG. 12 the line 146 provided in the lower anode space 106 is formed by an inner tube 200 and an outer tube 202. The outer tube has at its one end the inlet 144 for fresh fuel and also a perforated wall with perforations 204 through which the non-consumed fuel coming from the anode side flow fields can be sucked in in accordance with the arrows 205 and can be lead with the fresh fuel through a flow passage 208 formed between the two tubes 200, 202 to the end 210 of the outer tube 202 remote from the inlet 144 and there through the opening 212 of the inner tube 200 into this tube 200. This inner tube 200 leads the fuel to the outlet 148 of the first line arranged adjacent to the inlet 144.

One notes that the outer tube is closed at its end 210 remote from the inlet 144 and that the closed end of the outer tube which lies opposite to the open end of the inner tube has a deflection device 214 for the deflection of the fuel entering into the mouth 212 of the inner tube 200 with low pressure losses. The arrows which are drawn in show, as they also do in FIG. 11, the flow directions of the gases and of the fuel.

FIG. 11 shows a similar line layout for the third line 158 provided in the upper anode space 104 which is likewise formed by an inner tube 220 and an outer tube 222. The inner tube 220 has at its one end the inlet 156 for fuel and opens at its end 224 remote from the inlet inside the outer tube 222. The outer tube 222 has a perforated wall with perforations 226 through which a part of the ingoing fuel emerges in accordance with the arrows 228 and can enter into the anode side flow fields 40. A further part of the ingoing fuel can be guided through a flow passage 230 formed between the two tubes to the outlet 160 at the end of the outer tube 222 adjacent to the inlet 156 of the inner tube and from there further to the restrictor valve 164 and to the discharge valve 170.

The closed end 232 of the outer tube in the coaxial line 158 of FIG. 11 also has a deflection device 234 which serves for a flow favorable deflection of the fuel emerging from the mouth 236 of the inner tube 220, so that here the lowest possible pressure losses arise.

Finally FIG. 13 shows an alternative design of a fuel cell stack which has large similarities to the schematically illustrated system of FIG. 10 but is also distinguished from this system in that the first line in the lower anode space 106 and the third line in the upper anode space 104 are missing. The reference numerals used in FIG. 13 are however otherwise the same as used in FIG. 10, so that the previous description which was given for FIG. 10 also applies to FIG. 13 and thus does not have to be specially emphasized. It is possible, without using a first line and a third line to achieve, by matched dimensioning of the flow cross-sections in the line system and also in the flow fields 40, a situation in which the fresh fuel supplied by the inlet valve 142 enters together with the fuel coming out of the line 166 into the lower anode space 106 and is further mixed there with the non-consumed fuel which comes out of the anode side flow fields 40 and is then sucked in by the pump through the outlet 148 and fed into the upper anode space 104. There a part of the fuel flows into the anode side flow fields 40 while a further part enters into the fourth line 162. There it flows via the restrictor valve 164 and the further line 166 and is mixed with the fresh fuel which is fed in via the inlet valve 142. The mixing in the lower anode space 106 ensures that the gases which are fed into the upper anode space 104 and which thus enter into the anode side flow fields 40 have a uniform temperature and humidity distribution. In this manner it is possible to realize the invention even without the help of a first line 146 and a third line 158.

A further possibility of modification consists in providing the inlet 156 into the upper anode space 104 and also the outlet 160 out of the upper anode space 104 at opposite sides of the upper anode space 104 and a corresponding arrangement is also possible for the inlet 144 into the lower anode space 106 and for the outlet out of the lower anode space 106. An arrangement of this kind would also be possible when using a first line 146 in the lower anode space and a third line 158 in the upper anode space.

Simulations have shown that the return of fuel from the upper anode space into the lower anode space via the restrictor valve only brings a small advantage and that this return is not essential. In contrast the freshly supplied fuel must be fed into the lower anode space where it is mixed with the non-consumed moist fuel, which comes from the anode side flow fields, and is humidified and conditioned before this fuel mixture is fed via the pump into the upper anode space.

Figure 14:
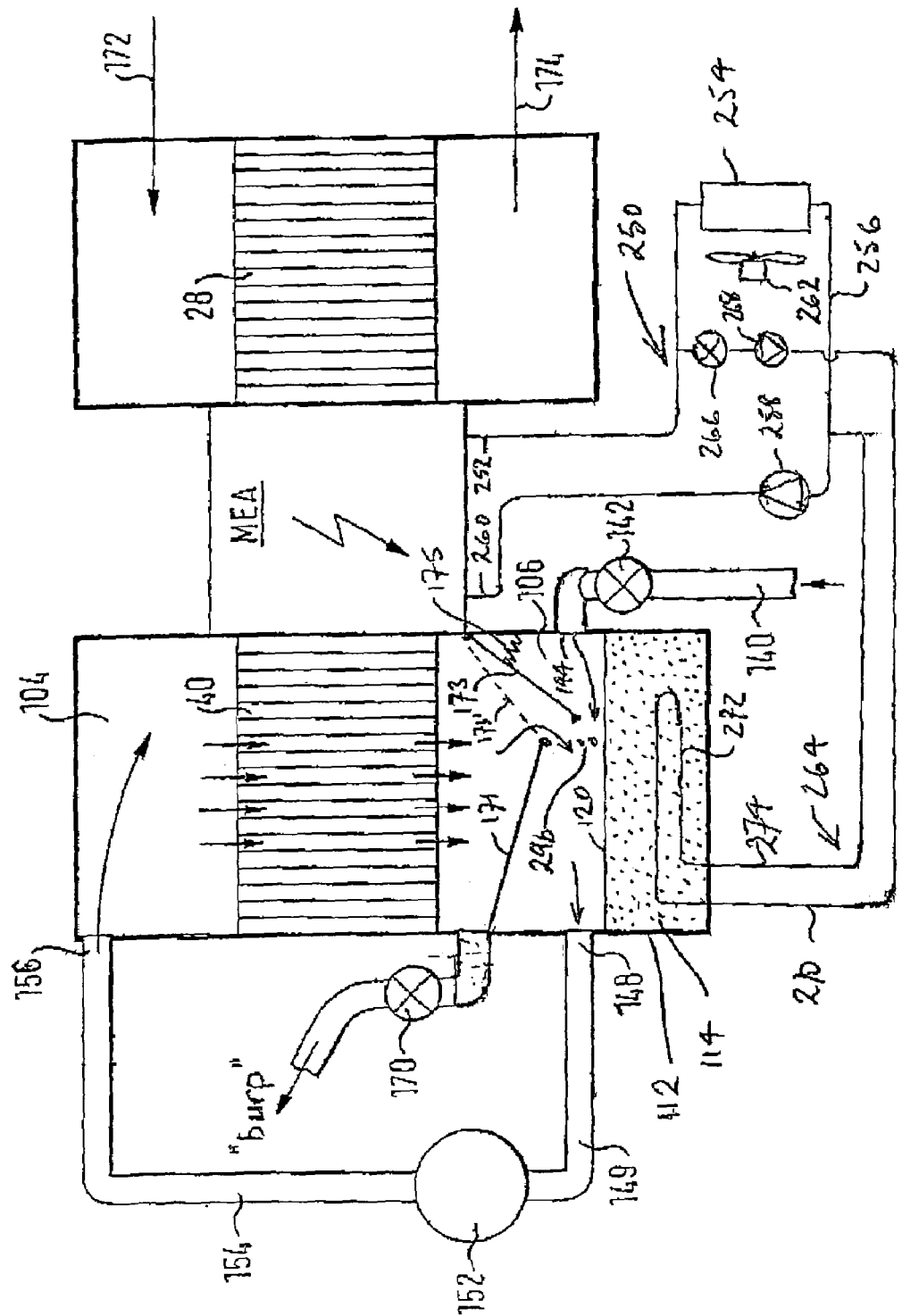
FIG. 14 shows a modified version of the embodiment of FIG. 13.

FIG. 14 shows a fuel cell system in a schematic representation similar to FIG. 13 but in which the return of fuel from the upper anode space into the lower anode space via the restrictor is dispensed with.

Most of the reference numerals used in FIG. 14 and in the further figures to identify specific items and features of the embodiments are the same reference numerals as were used in the previous figures to identify the same items or features, or items and features having the same function. The description previously given for these reference numerals will be understood to apply in just the same way to the further embodiments, unless something is stated to the contrary.

In the embodiment of FIG. 14 the fresh fuel is supplied via the line 140 and the inlet valve 142 to the inlet 144 which is disposed at an opposite or different side of the lower anode space 106 from the outlet 148 which leads, via the line 149, to the recirculation pump 152. Thus the recirculation pump 152 sucks in, from the lower anode space 106, both fresh, dry hydrogen coming from the valve 142 and also the hydrogen, nitrogen and water vapor emerging from the anode side flow fields 40. The pump 152 forwards the resulting gas mixture into the upper anode space 104 via the line 154. As a result of the pressure difference created by the recirculation pump 152 this gas mixture then flows through the anode flow fields 40 and back into the lower anode space 106, apart from a proportion of the hydrogen which migrates in the form of protons through the membranes of the MEAs to the oxygen flowing in the cathode side flow fields 28 of the fuel cell system. It is readily understood that the recirculation pump 152 is able to create a sufficient pressure difference to ensure flow through the anode flow fields 40 in the desired direction and that the humidity carried by the gases emerging from the anode flow fields is used to humidify the fresh gas received from the supply valve 142.

The discharge valve 170 used to bleed or burp part of the gas flowing in the anode circuit from the anode circuit is, in this embodiment, preferably provided at the lower anode space 106, for example in the position shown or alternatively above the inlet from the supply valve 142. It may be advantageous to provide a baffle system within the anode space to prevent fresh gas coming from the valve 142 passing directly to the burp valve 170 and being discharged from the anode circuit, since the idea is to flush the anode circuit with fresh hydrogen from the supply valve 142 and to discharge anode side exhaust gases having a high proportion of nitrogen.

In the design of FIG. 14 a fixed baffle 171 is provided extending at a downwardly inclined angle from the outlet leading to the burp valve and is supplemented by a flap 173 which is downwardly inclined from a pivot point at the opposite side wall of the lower anode space 106 from the outlet leading to the burp valve. An optional spring 175 holds the flap 173 approximately in the position shown when the burp valve is closed. The inclined positions of the baffle 171 and of the flap 173 allow liquid water 296 to drain into the collecting chamber. They also allow gases emerging from the anode flow fields to pass to the outlet 148 leading to the recirculation pump and fresh fuel to flow from the inlet 144 to the outlet 148. If the burp valve is opened the pressure in the space above the baffle 171 and the flap 173 reduces and the flap 173 pivots into the broken line position 173', which is aided by the pressure of the incoming fuel. In the broken line position 173' the flap 173 isolates the upper half of the lower anode space from the lower half and ensures substantially all the incoming fuel is picked up by the pump and forced by it into the upper anode space and through the anode flow fields 40 before being discharged through the burp valve 170. Thus the full anode circuit is effectively flushed with fresh fuel. The flap 173 thus functions as a check valve. This check valve arrangement can also be used in the embodiment of FIG. 15, but is omitted in that drawing for the sake of simplicity. In addition a check valve similar to flap 173 can be employed in the embodiment of FIG. 16 at the outlet 290 leading from the lower anode space 106 into the container 292.

In addition the embodiment of FIG. 14 shows a main cooling circuit 250 comprising a coolant outlet line 252 which leads to a radiator, i.e. a heat exchanger 254, with the outlet of the radiator passing via the line 256 to a coolant pump 258 which feeds the coolant under pressure via the inlet line 260 back into the cooling passages in the bipolar plates associated with the membrane electrode assembly. Coolant circuits of this kind are well known per se. In the usual way a fan 262 serves to produce a cooling air flow through the radiator 254 to cool the hot coolant emerging from the fuel cell stack.

The reference numeral 264 shows a bypass loop connected in parallel to the main coolant circuit 250 with this bypass loop containing a valve 266 and an auxiliary pump 268 which, when the valve 266 is fully or partially opened, is able to forward a supply of hot coolant through the line 270 to a heat exchanger loop or loops 272 arranged in the foam material 114 provided in the collecting trough 112 at the bottom of the lower anode space 106. Coolant leaving the heat exchanger loop or loops 272 passes via the line 274 back into the line 256 and is then conducted again via the pump 258 through the coolant circuit in the fuel cell stack. Either the valve 266 and/or the pump 268 can be controlled to determine the quantity of heat fed into the porous material 114 via the heat exchanger loop or loops 272. It has namely been found that, under certain circumstances and with certain designs, adequate evaporation of water collecting in the porous material 114 in order to adequately humidify the gases flowing in the anode circuit can only be achieved if the temperature of the water in the porous material 114 is raised slightly. The use of heat (waste heat) from the coolant circuit 250 is an efficient way of providing this further heating.

Moreover, it should be noted that it is not strictly necessary to provide a separate valve 266 and a pump 268 to feed coolant to the heat exchanger loop or loops 272. Instead the line 270 could branch off from the line 250 upstream of the pump 258 so that the pump 258 forwards a partial flow through the line 270 into the heat exchanger loop 272 and a further partial flow through the radiator 254. This arrangement again ensures that the heat exchanger loop or loops 272 is or are fed with hot coolant. Another possibility would be to place the pump 258 in the outlet line 252 of the main coolant circuit and to arrange the line 270 so that it branches off after the pump. The return line 274 could then pass into the line 260 or into the line 252 upstream of the pump. It would also be possible to branch off a part of the coolant flow internally, i.e. in the fuel cell stack itself, preferably just before it emerges from the fuel cell stack and feed it directly into the heat exchanger loop or loops 272.

Alternatively, instead of using a simple flow divider or branch in any of the ways recited above, a valve (not shown) could be provided which can be adjusted to vary the flow through the heat exchanger loop or loops 272 as required and in particular to stop this flow when it is not required. Other arrangements are also possible. Thus these embodiments recognize that it can be of advantage to heat the water located in the trough, or in a foam material provided there, in order to compensate for the reduction in temperature by evaporation, i.e. to achieve a higher degree of evaporation. This supply of heat required can thus take place via a heat exchanger or a heat exchanger loop as shown. Alternatively or in addition it can take place electrically as described later in connection with FIG. 16.

Figure 15:
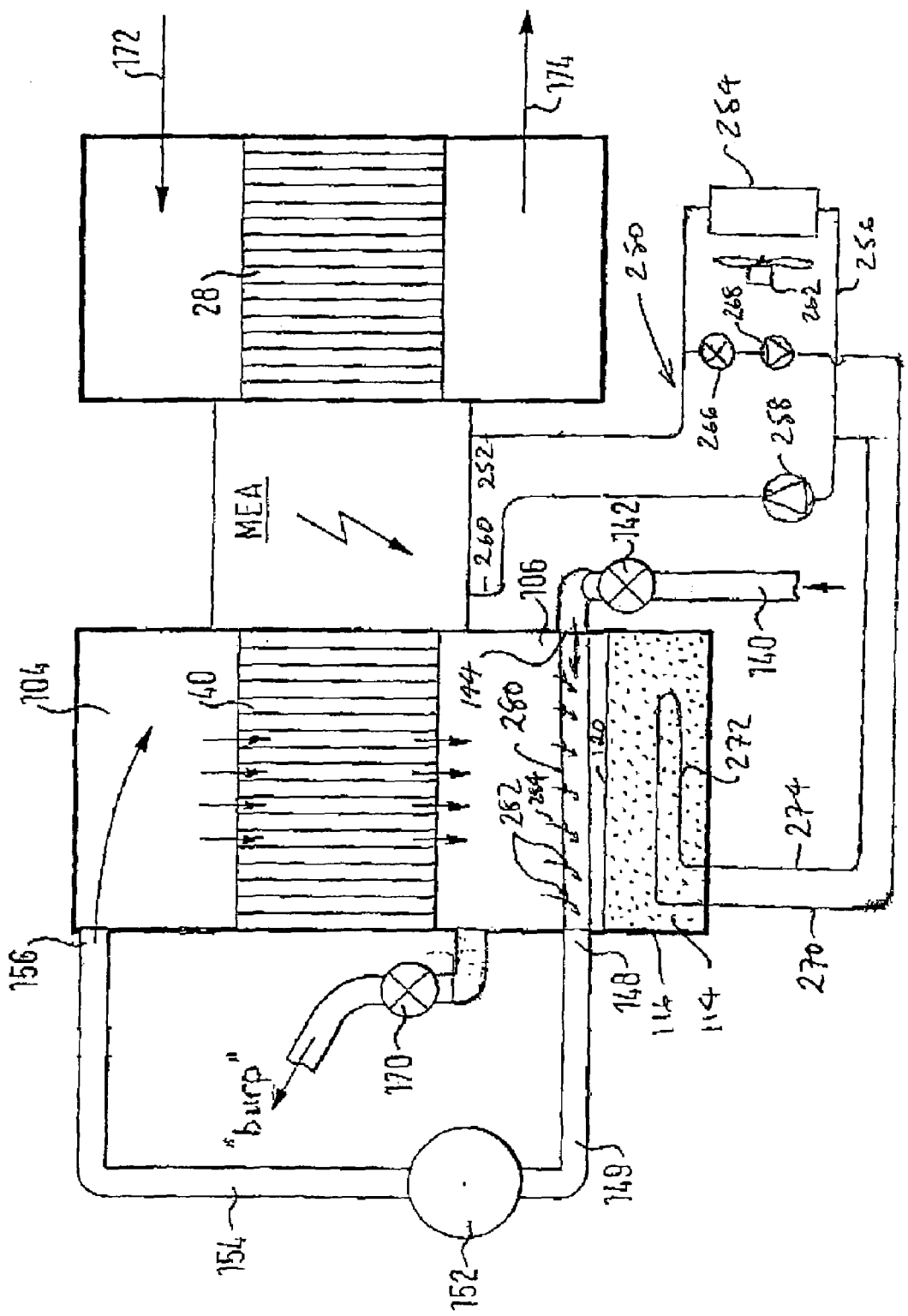
FIG. 15 shows a further modified version of the embodiment of FIG. 14.

FIG. 15 shows a further development of the embodiment of FIG. 14 and differs from the embodiment of FIG. 14 essentially only in that a pipe section 280 is provided which extends from the inlet 144, from the fuel supply valve 142 into the anode space 106, to the outlet 148 leading via the line 149 to the recirculation pump 152. The pipe 280 has a plurality of apertures 282 or a porous wall so that humidified gases emerging from the anode side flow fields 40 are sucked, in the manner shown by the arrows 284, through the apertures 282 and mixed in the line 149 and by the action of the pump 152 with the fresh hydrogen supplied via the supply valve 142.

It is noted that the overflow and drain system describe with reference to FIG. 9 can also be provided in the embodiments of FIG. 14, 15 (and 16) but has simply been omitted from the representation in order not to complicate the drawing unnecessarily.

Figure 16:
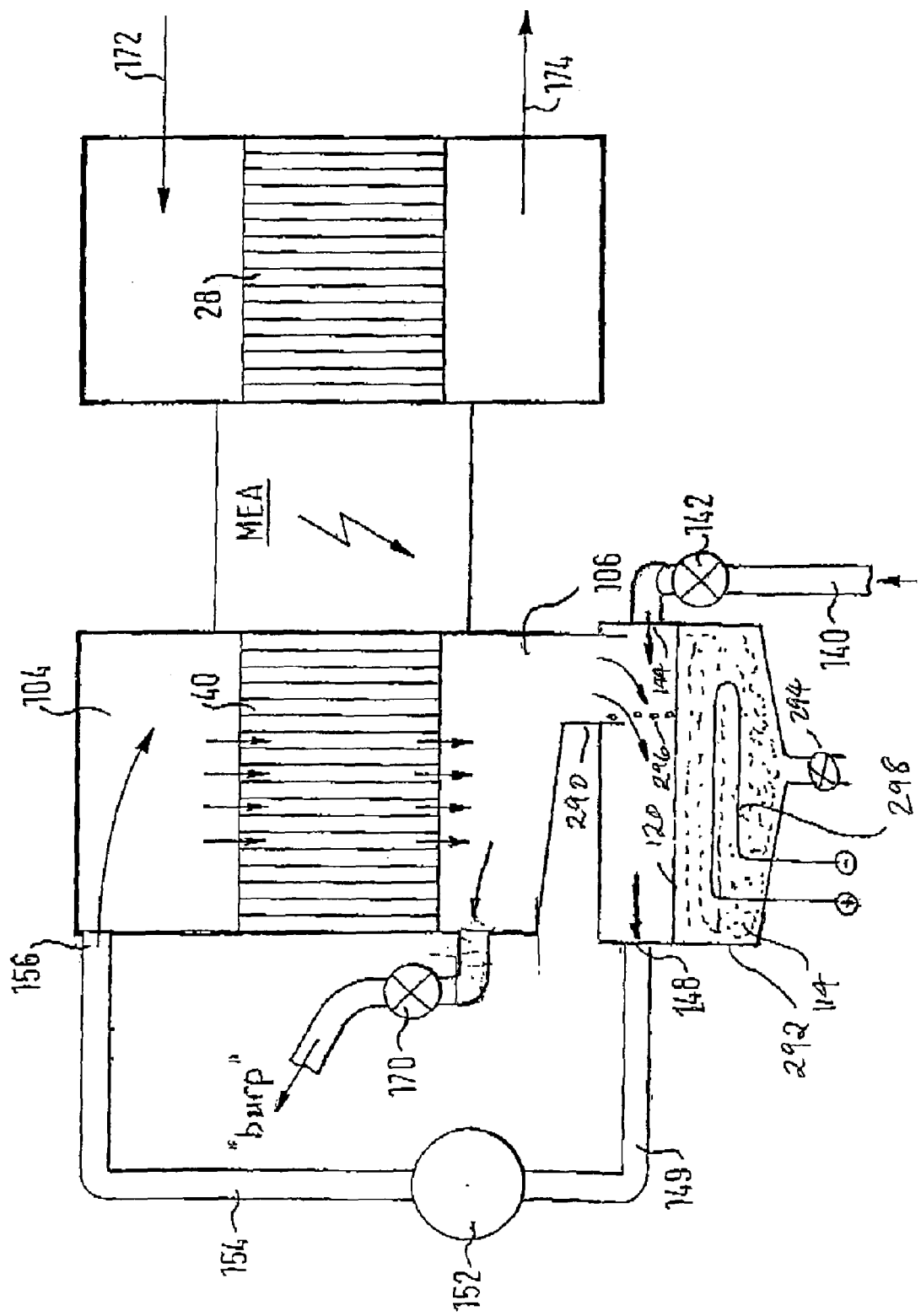
FIG. 16 shows a yet further modified version of FIG. 13.

FIG. 16 shows a yet further modified variant of the embodiment of FIG. 13 in which several important differences can be ascertained.

First of all the lower anode space 106 has been converted into a generally funnel-like structure with an outlet pipe 290 which leads into a separate water collecting tank 292. The water collecting tank 292 can be thought of as separate from the lower anode space 106 but is nevertheless in flow communication with the anode space 106 and thus effectively forms a part of it.

In this embodiment, the porous material 114 for storing liquid water is located in the separate collecting tank 292 and is filled up to the level 120 with liquid water 296 which drains via the outlet pipe 290 into the tank 292.

Furthermore, the fuel supply valve 142 feeds fresh fuel via the inlet 144 into the space above the porous material in the water collecting tank 292. It could, alternatively, feed the fresh hydrogen directly into the liquid contained in the porous material. Indeed this possibility also exists in the embodiment of FIG. 14.

The outlet pipe 290 from the anode space 106 is made sufficiently large that the gases emerging from the anode flow fields 40 can all readily pass into the space above the porous material 114 in the tank 292 without a significant pressure drop. They can then be sucked via the recirculation pump 152 through the outlet 148 from the collecting tank 292 into the line 149 and fed as previously into the upper anode space 104.

The burp valve 170 is, in this embodiment, conveniently connected to the lower anode space 106. Alternatively, it could also communicate with the gas space in the collecting tank 292.

As shown in this embodiment the provision for heating the water stored in the porous material 114 is realized here as an electrical heating element which can be fed with power generated by the fuel cell system and/or from a battery (not shown). This alternative could also be used in the other embodiments instead of the liquid coolant loop described with reference to FIGS. 14 and 15. Alternatively the liquid coolant possibilities described with reference to FIGS. 14 and 15 could be used in the embodiment of FIG. 16 as an alternative to the electrical heating system, or indeed in addition to it if this is deemed necessary for whatever reason, e.g. on start up when the coolant is too cold.

In the embodiment of FIG. 16 a pipe, such as 280 in FIG. 15, can again be used to connected the inlet 144 to the outlet 148.

In addition the collecting tank 292 can be provided with an overflow and drain system in like manner to that described in connection with FIG. 9.

The embodiment of FIG. 16 also shows that the base of the tank 292 is made sloping and provided with a drain valve 294 at the outlet. This drain valve 294 could be opened once the vehicle has parked to drain water from the anode side flow fields should there be a danger of this water freezing in undesired manner. The drain valve 294 could also be used with a suitable control system, instead of the drain valve 128 of FIG. 9, to keep the water level 120 at least substantially constant. Such a sloping base with a drain valve 294 could also be used in the other described embodiments if desired.

Figure 17:
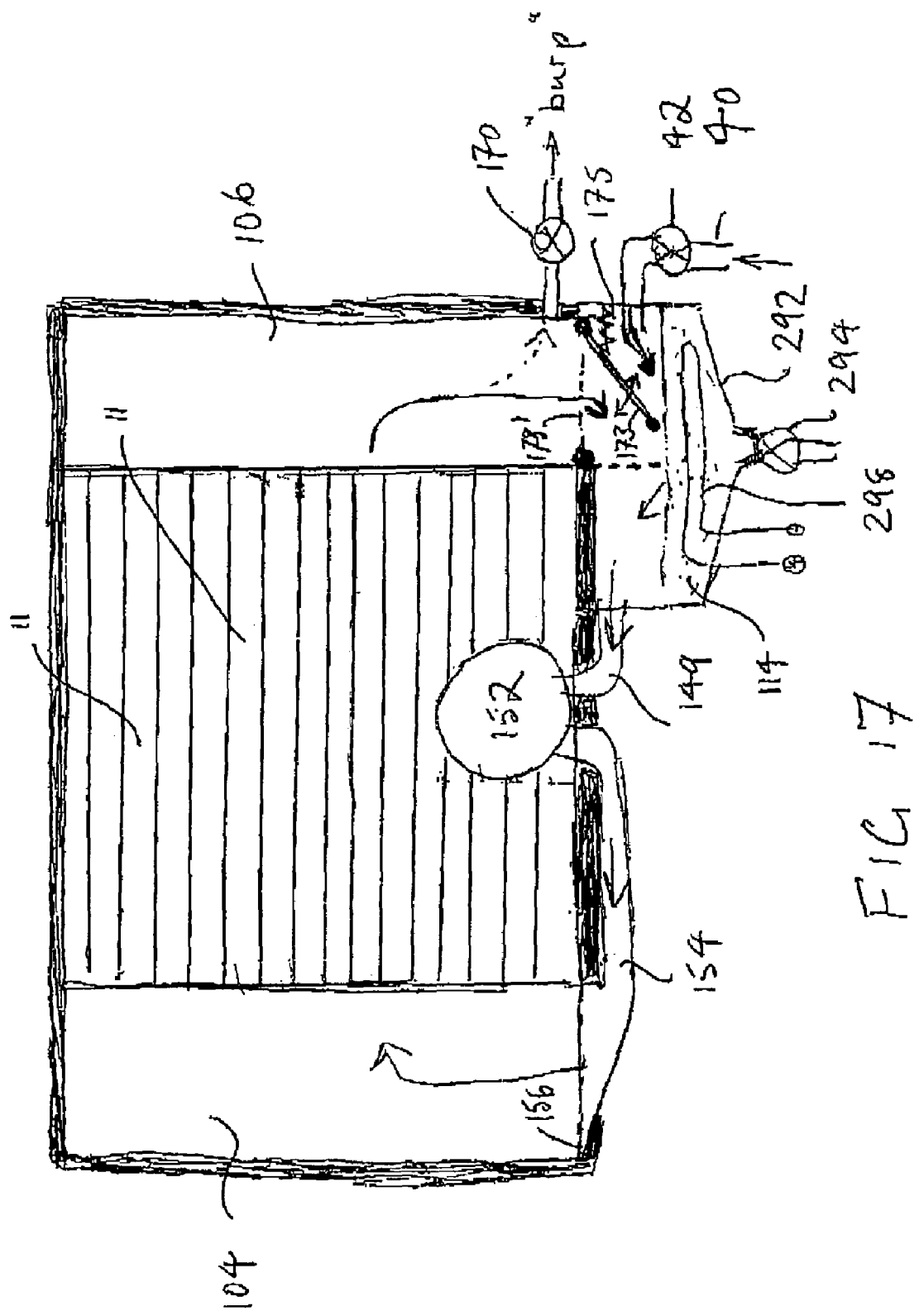
FIG. 17 shows an alternative embodiment of the invention.

Turning now to FIG. 17 there is shown an interesting further possibility of realizing the invention. It will be noted that the same reference numerals are used in FIG. 17 to identify components common to the other embodiments as were used for the relevant components in those other embodiments or for components having the same or a comparable function. The description given for such components will be understood to apply also to the embodiment of FIG. 17, unless something is stated to the contrary, indeed this applies to the description of all embodiments.

It has already been stated above that the use of an upper anode space and a lower anode space does not necessarily mean that the fuel cells 11 have to be vertically orientated in the fuel cell stack. FIG. 17 shows an arrangement in which the fuel cells 11 are disposed horizontally and extend between an anode inlet space 104 at one side region of the fuel cell stack and an anode outlet space 106 at a second and in this case opposite side of the fuel cell stack. They could also be disposed sloping downwardly from the anode inlet space 104 to the anode outlet space 106. In either case the flow of gases through the flow fields promotes the movement of liquid water into the anode outlet space.

In the embodiment of FIG. 17 the anode outlet space 106 is extended downwardly to form the collecting chamber 292 which may be a separate collecting chamber as described in connection with FIG. 16 or an insert for an anode outlet space as described in connection with the other embodiments. The provision of the collecting chamber below the lowermost fuel cell of the stack favors the draining of liquid water to the lowest point of the system.

The recirculation pump 152 or at least the outlet 148 from the anode outlet space is preferably disposed above the maximum level of water in the collecting chamber to prevent the pump 152 sucking in liquid water (also taking account of any possible inclination of the fuel cell stack when in operation in a vehicle). Reference numeral 173 again designates a pivoted flap which forms a check valve preventing a "short circuit" with fresh fuel flowing from the inlet 144 directly into the burp outlet valve 170 during the burping operation, in which the flap 173 adopts the position 173'. The burp outlet valve 170 is connected in this embodiment to the anode outlet space 106 above the flap 173. Thus the flap 173 again ensures that the entire anode circuit can be flushed with fresh fuel.

It should be noted that in the other embodiments the upper anode space 104 can also be thought of as an anode inlet space disposed in a first side region of the fuel cell stack and that the lower anode space 106 can similarly be thought of as an anode outlet space disposed in a second, opposite, side region of the fuel cell stack.

The above described arrangements have several important advantages.

Firstly, the systems described make it possible to separately set, i.e. independently, the inlet humidity at the anode side and the flow speed at the anode side of the fuel cell stack.

Secondly, the water which was previously separated out is returned into the gas phase in the anode circuit and used for the humidification of the anode gas.

Thirdly, the possibility exists of coupling the temperature of the anode gas to the coolant outlet temperature thus increasing the humidification of the anode gases with a significant saving of energy.

Fourthly, the previous external water separator can be avoided and the function of a mixer previously used to mix fresh fuel gas with the recirculated anode gases is integrated into the stack and realized without the need for a separate device.

Fifthly, the recirculation pump can be made smaller and a heat exchanger between the recirculation pump and the stack can be dispensed with.

It will be appreciated that the lower anode space is always humidified because the gas emerging from the anode flow fields in operation is humidified and because the water appearing in liquid form collects as a base pool in the lower anode space and contributes by evaporation to the humidification of the gases flowing in the anode circuit. By providing a porous medium which is saturated with the water in the base pool the surface area from which evaporation takes place can be increased and thus the humidification performance can also be increased. This porous medium should lie in a trough which is stable temperature-wise and preferably nonconductive. A discharge valve at the lowest point of the construction can serve for the draining of water after the system has been switched off in order to prevent freezing of this water.

Should the liquid water which arises not be sufficient for the humidification of the gases flowing at the anode side separate product water can be taken from the cathode side of the fuel cell system and, for example, sprayed via a pump and nozzle arrangement onto the porous medium. Alternatively this could also be done prior to feeding the hydrogen into the lower anode manifold, i.e. by supplying the additional water together with the fresh hydrogen in order to additionally achieve pre-heating of the hydrogen. Thus, it can also be advantageous to introduce additional water into the lower anode space and thus into the trough or into the sponge in order to always ensure an adequate humidification. For this purpose water collected at the cathode side can be used, for example.

If a further increase of the humidification performance is required then the porous medium can be additionally heated. This heating can be done either electrically, which has the disadvantage that it leads to a slight reduction of the overall performance of the fuel cell system, or a part of the coolant flow can be led through the porous medium in a heat exchanger loop in order to heat the porous medium and the water contained therein. A combination of these two possibilities is also conceivable.

When the return flow is omitted the discharge valve for the burp operation can be connected to the lower anode space.

In the present invention the pump must in principle only be laid out in order to ensure the desired flow through the anode side flow fields and also the transport of liquid water out of the anode side flow fields. It does not, however, have to circulate a large quantity of fuel in order hereby ensure a humidification of the fresh fuel since, in accordance with the invention, the humidification of the freshly supplied fuel takes place in the lower anode space by the specially effected evaporation process. In this way the pump can be made substantially smaller and requires substantially less energy to drive it.

The invention claimed is:

1. A method of operating a fuel cell stack comprising a plurality of fuel cells, each said fuel cell having an anode defining an anode side, a cathode defining a cathode side and a membrane arranged between said anode and said cathode, each said fuel cell being arranged between first and second bipolar plates, there being flow fields at said anode sides for a gaseous fuel supplied to said fuel cells and flow fields at said cathode sides for a gaseous oxidizing agent fed into said fuel cells and catalyst material within said fuel cells at which said fuel and said oxidizing agent react for the production of electrical energy with the simultaneous production of water, said fuel cells being connected together and having an upper anode space at a top of said fuel cell stack and a lower anode space at a bottom of said fuel cell stack, said anode side flow fields extending between said upper anode space and said lower anode space, said method comprising the steps of:
   collecting water produced during the electrochemical reaction and present in the form of a liquid in or adjacent to said lower anode space,
   evaporating at least a portion of said liquid water for the humidification of supplied fuel in or adjacent to said lower anode space,
   supplying the fuel humidified in or adjacent to said lower anode space to said upper anode space,
   feeding at least a part of said humidified fuel from said upper anode space into said anode side flow fields, and
   returning a part of said humidified fuel supplied to said upper anode space via a restriction to said lower anode space.

2. A method in accordance with claim 1, and comprising the further step of receiving said liquid water in a porous material to provide an enlarged evaporation surface.

3. A method in accordance with claim 2, and comprising the further step of mixing fresh fuel supplied to said lower anode space by said fuel supply device with non-consumed moist fuel emerging from the anode side flow fields.

4. A method in accordance with claim 3, and comprising the further step of discharging a part of the gases flowing at said anode sides of said fuel cells one of discontinuously or continuously in order to reduce an amount of nitrogen at said anode sides.

5. A method in accordance with claim 4, and comprising the step of stopping during said discharging step a return of a part of said fuel supplied to the upper anode space into the lower anode space via said restriction.

6. A method in accordance with claim 5, said stopping step comprising the step of a closing a restrictor valve forming said restriction.

7. A method in accordance with claim 5, and comprising the further step of closing a line extending from said lower anode space to said upper anode space for supplying fuel humidified in said lower anode space to said upper anode space during the discharging of said gases flowing at the anode side.

8. A method in accordance with claim 1, and comprising the further step of one of continuously and discontinuously discharging liquid water from said lower anode space.

9. A method in accordance with claim 1, and comprising the further step of supplying additional water to said anode side of said fuel cell stack.

10. A method in accordance with claim 9, said additional water being supplied to said anode sides of said fuel cells from said cathode sides of said fuel cells.

11. A method of operating a fuel cell stack comprising a plurality of fuel cells, each said fuel cell having an anode defining an anode side, a cathode defining a cathode side and a membrane arranged between said anode and said cathode, each said fuel cell being arranged between first and second bipolar plates, there being flow fields at said anode sides for a gaseous fuel supplied to said fuel cells and flow fields at said cathode sides for a gaseous oxidizing agent fed into said fuel cells and catalyst material within said fuel cells at which said fuel and said oxidizing agent react for the production of electrical energy with the simultaneous production of water, said fuel cells being connected together and having an upper anode space at a top of said fuel cell stack and a lower anode space at a bottom of said fuel cell stack, said anode side flow fields extending between said upper anode space and said lower anode space, said method comprising the steps of:
   collecting water produced during the electrochemical reaction and present in the form of a liquid in or adjacent to said lower anode space,
   evaporating at least a portion of said liquid water for the humidification of supplied fuel in or adjacent to said lower anode space,
   supplying the fuel humidified in or adjacent to said lower anode space to said upper anode space,
   feeding at least a part of said humidified fuel from said upper anode space into said anode side flow fields, and
   heating water collected in a collecting container.

12. A method in accordance with claim 11, said heating step being effected by feeding a heat transporting medium through a heat exchanger provided in said water in said collecting container.

13. A method in accordance with claim 12, said heating step being effected using a hot coolant used in a coolant circuit of said fuel cell stack as said heat transporting medium.

14. A method in accordance with claim 12, said heating step being carried out electrically in addition to heating effected by said heat transporting medium.

15. A method in accordance with claim 11, said heating step being carried out electrically.

16. A method of operating a fuel cell stack comprising a plurality of fuel cells, each said fuel cell having an anode defining an anode side, a cathode defining a cathode side and a membrane arranged between said anode and said cathode, each said fuel cell being arranged between first and second bipolar plates, there being flow fields at said anode sides for a gaseous fuel supplied to said fuel cells and flow fields at said cathode sides for a gaseous oxidizing agent fed into said fuel cells and catalyst material within said fuel cells at which said fuel and said oxidizing agent react for the production of electrical energy with the simultaneous production of water, said fuel cells being connected together and having an upper anode space at a top of said fuel cell stack and a lower anode space at a bottom of said fuel cell stack, said anode side flow fields extending between said upper anode space and said lower anode space, said method comprising the steps of:

providing fresh fuel to the fuel cell stack, directly contacting and mixing non-consumed fuel from the anode side flow field with said fresh fuel to provide a mixed feed stream, collecting water produced during the electrochemical reaction and present in the form of a liquid in or adjacent to said lower anode space, passing at least a portion of said mixed stream adjacent said collected water to exploit evaporation from said liquid water for the humidification of said mixed stream in or adjacent to said lower anode space, supplying said mixed stream humidified in or adjacent to said lower anode space to said upper anode space, and feeding at least a part of said humidified mixed stream from said upper anode space into said anode side flow fields.

* * * * *